(12) United States Patent
Lesso et al.

(10) Patent No.: US 10,935,439 B2
(45) Date of Patent: Mar. 2, 2021

(54) TEMPERATURE MONITORING

(71) Applicant: Cirrus Logic International Semiconductor Ltd., Edinburgh (GB)

(72) Inventors: John Paul Lesso, Edinburgh (GB); Gordon James Bates, Edinburgh (GB)

(73) Assignee: Cirrus Logic, Inc., Austin, TX (US)

( * ) Notice: Subject to any disclaimer, the term of this patent is extended or adjusted under 35 U.S.C. 154(b) by 327 days.

(21) Appl. No.: 16/105,484

(22) Filed: Aug. 20, 2018

(65) Prior Publication Data

US 2019/0064007 A1 Feb. 28, 2019

Related U.S. Application Data

(60) Provisional application No. 62/551,506, filed on Aug. 29, 2017.

(30) Foreign Application Priority Data

Sep. 25, 2017 (GB) ...................................... 1715505

(51) Int. Cl.
  *G01K 11/22* (2006.01)
  *G01K 15/00* (2006.01)
  (Continued)

(52) U.S. Cl.
  CPC ...................................... *G01K 7/32* (2013.01)

(58) Field of Classification Search
  USPC ............... 374/117, 1, 141, 170, 173; 331/66
  See application file for complete search history.

(56) References Cited

U.S. PATENT DOCUMENTS

2007/0176705 A1* 8/2007 Sutardja .................. H03L 1/026
  331/176
2007/0205834 A1* 9/2007 Easwaran ............... H03L 7/093
  331/16

(Continued)

FOREIGN PATENT DOCUMENTS

EP 0753726 A1 1/1997
EP 1233520 A2 8/2002

(Continued)

OTHER PUBLICATIONS

Combined Search and Examination Report under Sections 17 and 18(3), UKIPO, Application No. GB1715505.2, dated Jan. 26, 2018.

*Primary Examiner* — Mirellys Jagan
(74) *Attorney, Agent, or Firm* — Jackson Walker L.L.P.

(57) ABSTRACT

This application relates to methods and apparatus for temperature monitoring for integrated circuits, and in particular to temperature monitoring using a locked-loop circuits, e.g. FLLs, PLLs or DLLs. According to embodiments a locked-loop circuit (200, 600) includes a controlled signal timing module (201, 601), wherein the timing properties of an output signal ($S_{OUT}$, $S_{FB}$) are dependent on a value of a control signal and on temperature. A controller (201, 601) compares a feedback signal ($S_{FB}$) output from the timing module to a reference signal ($S_{REF}$) and generates a control signal ($S_C$) to maintain a desired timing relationship. A temperature monitor (202) monitors temperature based on the value of the control signal. For FLLs and PLLs the signal timing module may be a controlled oscillator (201).

28 Claims, 4 Drawing Sheets

(51) Int. Cl.
    *G01K 7/00*        (2006.01)
    *G01K 7/32*        (2006.01)

(56) References Cited

U.S. PATENT DOCUMENTS

| | | | | |
|---|---|---|---|---|
| 2009/0267700 A1* | 10/2009 | Mohanty | ........... | H03L 1/00 |
| | | | | 331/175 |
| 2009/0278614 A1* | 11/2009 | Dosho | ........... | H03L 7/0995 |
| | | | | 331/17 |
| 2012/0249249 A1* | 10/2012 | Shen | ........... | H03L 1/02 |
| | | | | 331/16 |
| 2014/0247095 A1* | 9/2014 | Edwards | ........... | H03L 1/027 |
| | | | | 331/176 |
| 2014/0266472 A1* | 9/2014 | Waldrip | ........... | H03L 7/103 |
| | | | | 331/17 |
| 2014/0292424 A1* | 10/2014 | Akaike | ........... | H03L 1/028 |
| | | | | 331/70 |
| 2015/0130546 A1* | 5/2015 | Kobata | ........... | G05D 23/2036 |
| | | | | 331/66 |
| 2016/0099720 A1* | 4/2016 | Bashir | ........... | H03L 7/0991 |
| | | | | 331/8 |

FOREIGN PATENT DOCUMENTS

JP          2009302224 A     12/2009
JP          2017046036 A     3/2017

\* cited by examiner

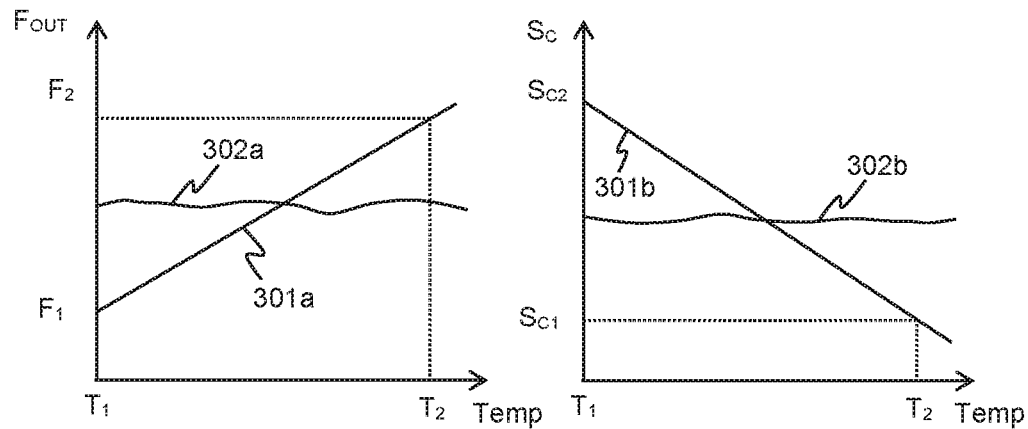
Figure 3a
Figure 3b
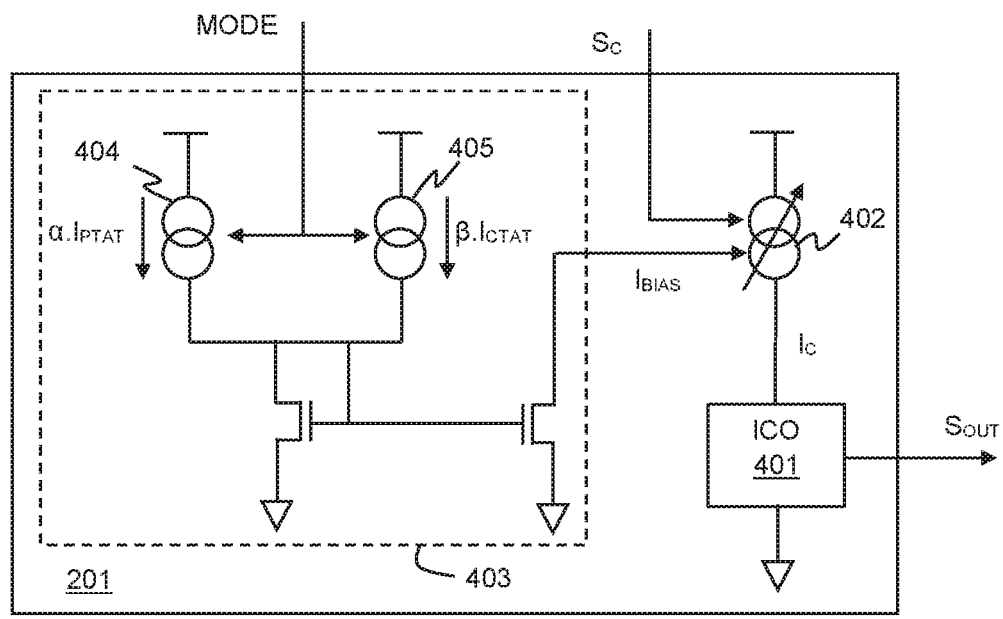
Figure 4

TEMPERATURE MONITORING

TECHNICAL FIELD

This application relates to methods and apparatus for temperature monitoring, in particular for temperature monitoring of integrated circuits and to detecting thermal runaway.

BACKGROUND

Temperature monitoring of circuitry may be useful for a variety of reasons. For example it may be desirable in some instances to monitor whether the temperature of the circuitry exceeds a defined operating range, which could be a safe operating range. Integrated circuits will generally generate heat in use. Elevated temperature can increase leakage currents, which may lead to more heat generation and further increase in temperature, which can lead to thermal runaway which could result in malfunction and/or damage of the circuitry and possibly the host device.

With a trend towards ever smaller process node geometries for integrated circuits, the issue of heat generation is becoming more important. Such integrated circuits may have a greater density of active components leading to a greater power dissipation per unit area of semiconductor. Smaller process node geometries may have more issues with heat generation, for example small geometry ICs may experience greater leakage, e.g. gate leakage currents due to thinner gate dielectrics or greater sub-threshold drain-source leakage currents at the lower operating voltages etc., which leakage currents may inherently increase rapidly with temperature.

It is known therefore that dedicated sensors may be provided as part of an integrated circuit for monitoring aspects of the circuit operation in use, including temperature. For instance PVT (process, voltage and temperature) sensors are known for use on ICs.

Such PVT monitors can usefully monitor temperature at a location of a circuit, but do require some chip area to implement the monitor, thus adding to the size and cost of the circuitry. Such sensors may also involve analogue circuitry requiring at least some analogue circuit design and, for at least some applications, there is a desire to minimise analogue circuitry. Also such temperature sensors may require initial calibration to operate correctly which may add to the testing/calibration steps required for the circuitry.

SUMMARY

Embodiments of the present disclosure relate to advantageous methods and apparatus for temperature monitoring.

Thus according to an aspect there is provided a locked-loop circuit comprising:
 a controlled oscillator operable to generate an output signal at an output frequency based on the value of a control signal; and
 a controller operable to compare a feedback signal derived from the output signal to a reference signal received at a reference signal input to generate said control signal;
 wherein the controlled oscillator is operable in a first mode in which a value of the control signal required to maintain a certain output frequency changes with temperature; and the circuit comprises a temperature monitor for monitoring temperature based on the value of the control signal.

The temperature monitor may be configured to monitor the value of the control signal against one or more thresholds and to generate an alert if said thresholds are crossed. In some implementations the circuit may be operable such that output frequency is variable in use. In such a case the one or more thresholds may be selected based on an indication of the output frequency. The temperature monitor may be configured to monitor temperature based the value of the control signal and an indication of the output frequency.

In some instances the temperature monitor may be configured to determine an estimate of present temperature based on the value of the control signal. If the circuit is configured such that output frequency is variable in use, the temperature monitor may be configured to determine an estimate of present temperature based on the value of the control signal and on an indication of the output frequency.

The temperature monitor may configured to receive a version of the output signal and determine the indication of the output frequency. In some instances the locked-loop circuit may comprise a frequency divider configured to apply frequency division to a version of the output signal based on a controllably variable division value to provide the feedback signal. The temperature monitor may be provided with the division value as, at least part of, the indication of the output frequency. Additionally or alternatively the temperature monitor may be configured to receive an indication of the reference frequency as, at least part of, said indication of the output frequency.

In some implementations the temperature monitor may be configured to monitor the value of control signal for changes that indicate a continuing increase in temperature.

The controlled oscillator may comprise a bias circuit for generating a bias for the controlled oscillator. The bias circuit may be configured to generate the bias having a controlled temperature dependence so as to provide a first transfer function for the controlled oscillator between output frequency and value of the control signal, wherein the first transfer function has a distinct temperature dependence. The controlled oscillator may comprise a current controlled oscillator and a programmable current source controlled by the control signal. The bias circuit may supply the bias to the programmable current source.

In some implementations the control signal comprises a digital signal having a value defined by a digital value.

In some implementations, in the first mode, the controlled oscillator has a first transfer function between output frequency and value of the control signal, and the controlled oscillator is further operable in a second mode with a second transfer function between output frequency and value of the control signal that exhibits a lesser temperature dependence than the first transfer function. The second transfer function may exhibit substantially no variation with temperature over the defined temperature range. The first transfer function may exhibit a variation with temperature over the defined temperature range which has a magnitude which is of the order of 15% or greater, or 20% or greater, or 25% or greater than that for the second transfer function. The circuit may be configured to be responsive to a control signal to enable or disable temperature sensing. The controlled oscillator may be controller to operate in the first mode when temperature sensing is enabled and in the second mode when temperature sensing is not enabled. In some implementations the bias circuit discussed earlier may be present and may be configurable so as to provide a bias with a first temperature dependence in the first mode and a second temperature dependence in the second mode.

In some embodiments a switching arrangement may be located in a signal path between the controller and the controlled oscillator, and the circuit may be operable in a closed-loop mode in which the switch arrangement is configured to supply the control signal from the controller to the controlled oscillator. The circuit may also be operable in an open-loop mode, in which the switch arrangement is configured to supply a defined control value to the controlled oscillator as the control signal. In the open-loop mode the temperature monitor may be configured to receive a version of the output signal generated in response to the defined control value and to monitor temperature by monitoring the frequency of the output signal.

The locked-loop circuit may any type of locked-loop circuit, and in some implementations may be a frequency-locked-loop circuit or a phase-locked-loop circuit.

The locked-loop circuit may be implemented as an integrated circuit.

Embodiments also relate to an electronic device comprising a locked-loop circuit as described in any of the variants above. The device may be at least one of: a portable device; a battery powered device; a communications device; a mobile or cellular telephone; a smartphone; a computing device; a notebook, laptop or tablet computing device; a wearable device; a smartwatch; a voice-controlled device; a gaming device.

In another aspect there is provided a method of temperature monitoring comprising:
 operating a locked-loop circuit to compare a feedback signal derived from an output signal to a reference signal received at a reference signal input to generate a control signal; and
 monitoring temperature based on the value of the control signal.

In a further aspect there is provided a locked-loop circuit comprising:
 a controlled signal timing module operable to generate an output signal; and
 a controller operable to compare a feedback signal, output from the controlled signal timing module, to a reference signal received at a reference signal input to generate a control signal for controlling the controlled signal timing module;
 wherein the controlled signal timing module is operable in a first mode in which a value of the control signal required to maintain a certain timing relationship between the feedback signal and the reference signal changes with temperature; and
 the circuit comprises a temperature monitor for monitoring temperature based on the value of the control signal.

In a further aspect there is provided a locked-loop circuit comprising:
 a reference signal input for receiving a reference signal;
 a controlled signal timing module operable in a first mode to output a feedback signal, wherein the timing properties of the feedback signal are dependent on a value of a control signal and on temperature;
 a controller operable to compare the feedback signal to the reference signal and thus to generate the control signal at that control signal value required to maintain a certain timing relationship between the output signal and the reference signal at the current temperature; and
 a temperature monitor for monitoring temperature based on the value of the control signal.

The locked-loop circuit of these further aspects may be any of a frequency-locked-loop or a phase-locked loop, in which case the signal timing module may comprise a controlled oscillator and embodiments may be implemented according to any of the variants discussed above. The locked-loop circuit could further be a delay-locked-circuit, in which case the signal timing module may comprise an delay line. The variant discussed above relating to the configuration and operation of the temperature monitor apply equally to a delay-locked-circuit and the delay line may be operable in various modes as also discussed above.

In a yet further aspect there is provided a locked-loop circuit comprising:
 a controlled oscillator operable in a first mode with a first transfer function that varies with temperature such that a value of a control signal required to maintain a certain output frequency changes with temperature across a defined temperature range and further operable in second mode in with a second transfer function that exhibits a lesser temperature dependence than the first transfer function; and
 a temperature monitor for monitoring temperature based on the relationship between the value of the control signal and the output frequency when the controlled oscillator is operating in said first mode.

In a yet further aspect there is provided a temperature monitoring circuit comprising:
 a controlled oscillator operable with a first transfer function between a value of an input control signal and an output frequency that varies with temperature; and
 a temperature monitor for monitoring temperature based on the relationship between the value of the control signal and the output frequency;
 wherein the controlled oscillator forms part of a locked-loop circuit.

In another aspect there is provided a locked-loop circuit comprising:
 a controlled delay line operable to receive an input signal, apply a controlled delay to the input signal and output at least a first signal based on the delayed input signal wherein the controlled delay applied is based on the value of a control signal; and
 a controller operable to compare a feedback signal derived from the first signal to a reference signal received at a reference signal input to generate said control signal;
 wherein the controlled delay line is operable such that a value of the control signal required to maintain a certain delay changes with temperature; and
 the circuit comprises a temperature monitor for monitoring temperature based on the value of the control signal.

In another aspect there is provided a locked-loop circuit comprising:
 a reference input for receiving a reference signal;
 a controlled delay line operable to apply delays to the reference signal to provide one or more delayed signals and to output a feedback signal based on one or more of the delayed signals, wherein the delays are controlled dependent on a value of a control signal, wherein the controlled delay line is operable in a mode in which the delays are also dependent on circuit temperature; and
 a controller operable to generate said control signal at a control signal value required to maintain a timing relationship between the feedback signal and the reference signal at the current temperature;

wherein the circuit comprises a temperature monitor for monitoring temperature based on the value of the control signal.

The various features and variants described with respect to any aspect above may also be used with or applied to the other aspects, unless expressly indicated otherwise and the various features may be implemented in any combination, unless clearly indicated as being incompatible.

BRIEF DESCRIPTION OF THE DRAWINGS

To better explain and illustrate aspects of the present disclosure, various embodiments will now be described, purely by way of example only, with reference to the accompanying drawings, of which:

FIGS. 3a and 3b illustrate examples of transfer functions of a controlled oscillator with different temperature dependence;

FIG. 4 illustrates a controlled oscillator arrangement;

DETAILED DESCRIPTION

Embodiments of the present disclosure relate to temperature monitoring and in particular to the use of a controlled signal timing module, such as a controlled oscillator, for temperature monitoring, where the controlled signal timing module, e.g. oscillator, is also operable as a part of a locked-loop circuit for generating a desired output signal with a locked timing relationship to the input signal. In at least some embodiments a controlled oscillator may thus be operable as part of a locked-loop circuit, for example as part of a frequency-locked-loop for frequency synthesis, but is also operable to provide temperature sensing.

Embodiments thus relate to temperature monitoring using components of the circuit that are not just provided for monitoring the operation of the circuit and instead may be able to provide some other functionality. The temperature monitoring may therefore be largely provided by components that would, in any case, be included in the circuit for other purposes. Embodiments may thus effectively utilize circuit components that may already be present in a circuit design to provide temperature monitoring. This can make it economic in terms of chip area to provide the ability for additional temperature monitoring capability to that provided from a dedicated PVT monitor, for instance for distributed temperature sensing at different locations of an integrated circuit, or in some embodiments may allow for temperature monitoring of a circuit without requiring a dedicated temperature sensor to be provided.

Locked-loop circuits, for example frequency-locked loops (FLLs), phase-locked-loops (PLLs) or delay-locked-loops (DLLs), are known and used in a variety of applications. Locked loop circuits typically comprise a signal timing module that provides an output signal that has a controlled timing relationship, i.e. a controlled relationship of frequency and/or phase, to an input signal. The input signal is an oscillating signal, such as a clock signal and may be a reference signal. A feedback signal derived from the signal timing module, which in some instances may be a signal tapped from the output signal or which may be a separate signal output from the signal timing module, is, via a feedback path, compared to the input signal to control the signal timing module to maintain a desired locked relationship between the input and feedback signal, and hence the input and output signals. For FLLs and PLLs the signal timing module may comprise a controlled oscillator that generates an oscillation signal that is output as the output signal. The controlled oscillator may, for example comprise a ring oscillator formed from a ring of delay elements. For DLLs the signal timing module may comprise a delay line, e.g. comprising a series of delay elements.

Figure 1:
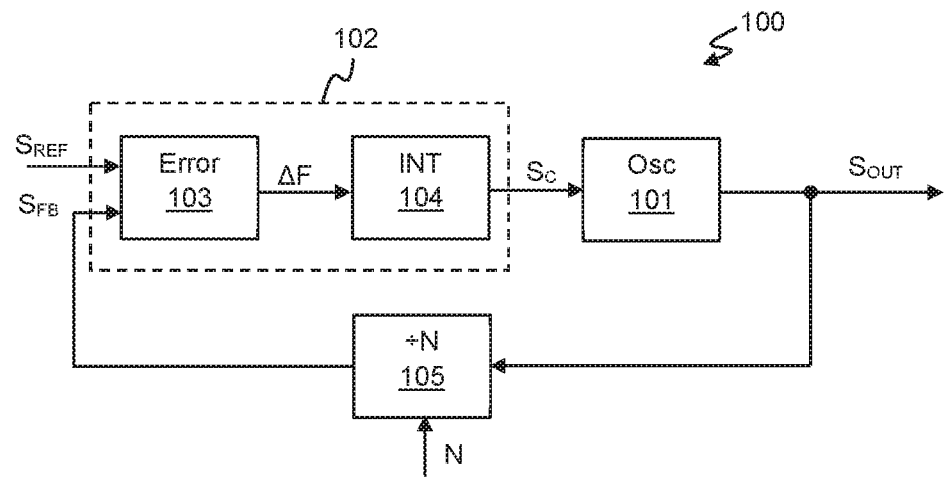
FIG. 1 illustrates an example of a locked-loop circuit.

FIG. 1 illustrates the basic principle of a FLL 100 for frequency synthesis. A controlled oscillator 101 is controlled by a controller 102 to provide an output signal $S_{OUT}$ having a desired output frequency $F_{OUT}$. The controller 102 thus provides a control signal $S_C$ to the controlled oscillator 101 so as to cause it to generate the output signal $S_{OUT}$. The output frequency $F_{OUT}$ will vary with the control signal $S_C$ according to a transfer function $K_{OSC}$ for the oscillator, such that $F_{OUT}=K_{OSC}(S_C)$. The control signal may physically be a voltage value or current value or may be a digital control value, i.e. a control word.

To stabilise the output signal $S_{OUT}$ at the desired output frequency $F_{OUT}$, the controller 102 compares a feedback signal $S_{FB}$, which is derived from the output signal $S_{OUT}$, to a reference signal $S_{REF}$ at a defined reference frequency $F_{REF}$. Typically the controller 102 has an error block 103 that determines the extent of any frequency error $\Delta F$ between the frequency $F_{FB}$ of the feedback signal $S_{FB}$ and the reference frequency $F_{REF}$. The controller may also have an integrator 104, or some other loop filter, which generates a control signal $S_C$ for the controlled oscillator 101. A frequency divider 105 may be arranged in the feedback path so that the feedback signal $S_{FB}$ provided to the controller 102 has a frequency $F_{FB}$ which is divided by a certain value N compared to the frequency $F_{OUT}$ of the output signal $S_{OUT}$, i.e. $F_{FB}=F_{OUT}/N$.

The operation of the FLL 100 is such that the controller 102 adjusts the control signal $S_C$ so as to control the oscillator 101 to reduce the frequency error $\Delta F$ to zero. This occurs when the frequency $F_{FB}$ of the feedback signal $S_{FB}$ is equal to the reference frequency $F_{REF}$. Thus the output frequency $F_{OUT}$ is stabilised to a value of $N \cdot F_{REF}$. The frequency divider 105 may be controllable to apply different division values, i.e. different values of N, so that the output frequency $F_{OUT}$ can be controlled to a desired multiple of the reference frequency $F_{REF}$. In some embodiments the value of N may be rapidly modulated in use, to define a non-integer average value of N and thus provide non-integer scaling of frequency.

It will be understood that the output frequency $F_{OUT}$ is thus stabilised to a desired multiple of the reference frequency $F_{REF}$. The stability of the reference frequency $F_{REF}$ thus clearly has an impact on the stability of the output frequency $F_{OUT}$. The reference signal $S_{REF}$ thus should preferably have a stable frequency, i.e. a frequency stable to temperature and supply variations etc. In some implementations a suitably accurate reference signal may be supplied from a source external to the integrated circuit comprising the FLL 100 and may be received at some suitable contact, e.g. a pad or pin of the circuit. Alternatively the reference signal $S_{REF}$ may be generated on part of the same integrated circuit as the FLL 100 using a suitably temperature-insensitive oscillator arrangement as would be readily understood by one skilled in the art. One external source or on-chip oscillator arrangement may be used to generate a single signal $S_{REF}$ having a stable reference frequency $F_{REF}$ which can then be supplied to each of a plurality of FLLs (and/or other locked-loop circuits) to generate respective suitable output signals $S_{OUT}$ at different desired reference frequencies.

The transfer function $K_{OSC}$ of the controlled oscillator 101 may have a temperature dependence. In some locked-loop designs the controlled oscillator 101 may be arranged to have a transfer function that is relatively flat with temperature, i.e. $K_{OSC}(T) \approx$ constant. However, because the output frequency $F_{OUT}$ is stabilised by the action of the feedback loop, temperature stability of the transfer function $K_{OSC}$ of the controlled oscillator 101 is not required to maintain a temperature-stable output frequency $F_{OUT}$.

Some embodiments of the present disclosure thus utilise a controlled oscillator, which is arranged as a signal timing module of part of a locked-loop circuit, where the controlled oscillator is operable with a transfer function $K_{OSC}$ that varies with temperature. If, the controlled oscillator operates with a transfer function $K_{OSC}$ that varies with temperature, and the variation of the transfer function $K_{OSC}$ with temperature is predictable, and of sufficient degree such that the value $S_C(F_{OUT})$ of the control signal $S_C$ required to maintain a certain output frequency $F_{OUT}$ will change significantly with temperature, then it is possible to determine information about the operating temperature based on an indication of the value of the control signal $S_C(F_{OUT})$. In some instances, if the variation of transfer function with temperature is characterised, at least to some degree, then it may be able to determine an estimate of temperature (of the controlled oscillator). In some instances however monitoring the value of the control signal $S_C$ for changes may indicate temperature variations such as associated with thermal runaway.

As noted above the output frequency $F_{OUT}$ depends on the value of the control signal $S_C$ and the transfer function $K_{OSC}$, such that $F_{OUT} = K_{OSC}(S_C)$. If the transfer function varies with temperature such that the transfer function $K_{OSC}(T_1)$ at a first temperature $T_1$ is different to the transfer function $K_{OSC}(T_2)$ at a first temperature $T_2$, then a different value of control signal $S_C$ will be required at the first temperature as compared to the second temperature to maintain a desired output frequency.

Figure 2:
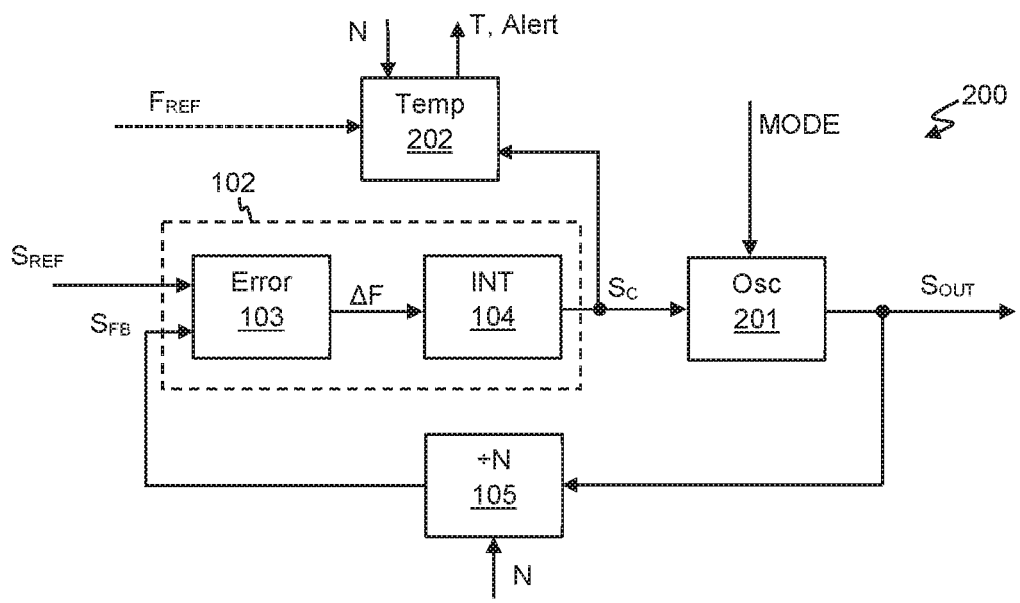
FIG. 2 illustrates an example of a locked-loop circuit operable to provide temperature monitoring.

FIG. 2 illustrates one embodiment of a circuit 200 operable as a locked-loop circuit but with temperature monitoring capability. Similar components to those illustrated in FIG. 1 are identified using the same reference numerals.

The circuit 200 of FIG. 2, like the FLL illustrated in FIG. 1, has a controller 102 and a feedback loop which may include a frequency divider 105. The embodiment of FIG. 2 however includes a controlled oscillator 201 which is operable with a transfer function $K_{OSC}$ that varies with temperature in a defined way. In use as an FLL the circuit 200 may operate as described above.

The circuit 200 also includes a temperature monitor block 202 which receives a version of the control signal $S_C$. By monitoring the value of the control signal $S_C$ the temperature monitor 202 can effectively monitor the temperature.

In some embodiments, based on the value of the control signal $S_C$ and knowledge of or an indication of the output frequency $F_{OUT}$, the temperature monitor block 202 may determine an estimate of temperature T. As described above the value of the control signal $S_C$ and the output frequency $F_{OUT}$ are related by a temperature-dependent transfer function $K_{OSC}$ such that $F_{OUT} = K_{OSC}(S_C)$ where the transfer function $K_{OSC}$ varies with temperature. From this relationship, if the value of $F_{OUT}$ is effectively known then the value of $S_C$ required to generate this given output frequency $F_{OUT}$ for a given temperature may be derived. More generally, the value of $S_C$ required for each of a set of temperatures may be derived and used to construct a transfer function of $S_C$ versus temperature for this value of $F_{OUT}$, and inversely, i.e. a transfer function $T_S$ between temperature T and control signal $S_C$ wherein $T = T_S(S_C)$. The transfer function may be constructed by a curve-fitting process, for example a polynomial curve fitting process. Thus based on the present value of the control signal $S_C$ an estimate of the present temperature of the controlled oscillator can be determined, which will be an indication of the ambient temperature of the circuit at that location.

In some embodiments the output frequency $F_{OUT}$ of the FLL circuit 200 may effectively be predetermined as limited to a single value. For instance if the FLL 200 is designed to operate with a defined reference signal $S_{REF}$ at a constant, known, reference frequency $F_{REF}$ and the division value N of the frequency divider 105 (if present) is also constant, then the value of the output frequency $F_{OUT}$ is effectively fixed and known in advance. In which case the temperature monitor 202 may simply receive the value of the control signal $S_C$ required to provide this output frequency $F_{OUT}$ and determine an indication of temperature therefrom based on a single transfer function $T = T_S(S_C)$ derived with respect to the single value of output frequency $F_{OUT}$.

In some embodiments the output frequency $F_{OUT}$ may be variable in use, for instance by varying the division value N of the frequency divider 105. In such a case the temperature monitor 202 may also receive an indication of the division value N. If the reference frequency $F_{REF}$ is fixed, the division value defines the output frequency $F_{OUT}$ according to $F_{OUT} = N \cdot F_{REF}$ as discussed above.

Additionally or alternatively in some instances the reference frequency $F_{REF}$ of the reference signal $S_{REF}$ may itself be variable. In which case the temperature monitor 202 may be provided with an indication of the reference frequency $F_{REF}$. This could for instance be an indication of a system operating mode, where the reference frequency for each of a plurality of operating modes is predetermined and known or available to the temperature monitor 201.

In some embodiments the reference frequency $F_{REF}$ or the output frequency $F_{OUT}$ itself could be determined by some frequency monitoring component to provide an indication of the indication of the output frequency, either directly if the output frequency $F_{OUT}$ itself is measured or as $N \cdot F_{REF}$ is the reference frequency $F_{REF}$ is measured.

In any case, in the event that the output frequency $F_{REF}$ is variable then the temperature monitor 202 may, in some embodiments, be provided with sufficient information to identify an operating regime of the FLL circuit in terms of the expected or measured output frequency $F_{OUT}$. For instance, the information may comprise a separately defined transfer function $T_S(S_C)$ for each anticipated value of the output frequency $F_{OUT}$.

In some implementations the temperature monitor 202 may determine an estimate of temperature based on the value of the control signal $S_C$ and the operating regime, i.e. the indication of the expected or measured output frequency $F_{OUT}$. In such a case the value of control signal $S_C$ required to generate the particular output frequency $F_{OUT}$ at a range of temperatures may have been characterised in advance by simulation or by measurements and used to derive a function $T_S(S_C)$ which can be used to determine an estimate of temperature from the value of control signal $S_C$.

In embodiments where the locked-loop circuit may operate in different operating regimes wherein the desired output frequency $F_{OUT}$ may take different respective values, the temperature monitor may receive an indication of the current desired value of $F_{OUT}$. This may for example take the form of a digital word that directly represents the value of $F_{OUT}$. Alternatively the indication may take the form of digital words that represent the current values of reference frequency $F_{REF}$ and/or division value N. The temperature monitor may thus (if appropriate) determine the operating regime, e.g. based on an indication of desired output frequency $F_{OUT}$, reference frequency $F_{REF}$ and/or division value N, and then use the present value of control signal $S_C$ and an appropriately selected transfer function $T_S(S_C)$ to determine an estimate of temperature T. In some embodiments a plurality of discrete transfer functions $T_S(S_C)$ may be stored, each corresponding to particular values of say $F_{OUT}$. In some embodiments a function $T_C(S_C, F_{OUT})$ may be stored describing a surface in a space with coordinates ($S_C$, $F_{OUT}$ and T), effectively interpolating between the discrete transfer functions to provide coverage for a continuous range of $F_{OUT}$. The interpolation may be performed using known surface fitting algorithms, for example a least-mean-squares multi-dimensional polynomial algorithm.

The digital words indicative of desired output frequency $F_{OUT}$, reference frequency $F_{REF}$ and/or division value N may be stored in memory, for example control registers co-integrated with other lock-loop circuitry and read on demand by circuitry of temperature monitor 202 or associated processor circuitry.

Temperature monitor 202 may implement the functions $T_S(S_C)$ or $T_S(S_C, F_{OUT})$ by means of a look-up table, or by hard-wired logic to implement the required arithmetic, or by means of suitable software code running on programmable processor circuitry. The look-up table or local storage or coefficients necessary to implement the function $T_S(S_C)$ or the software code may be stored non-transiently in memory. This memory or the processor circuitry or other components of temperature monitor 202 may be co-integrated with other components of the locked-loop circuitry.

In some instances the estimate of temperature T that is outputted may be used by some other circuit or device level control. In some instances the estimated temperature may be monitored by the temperature monitor 202, e.g. to generate an alert if the temperature exceeds a defined operating range or exhibits some defined characteristic such as a rapid increase.

Additionally or alternatively the temperature monitor 202 may monitor the value of control signal $S_C$ against one or more thresholds, possibly with hysteresis, and generate an alert if said thresholds are crossed. The thresholds may correspond to values of $S_C$ corresponding to predefined values of temperature for defined operating ranges. The thresholds may be selected or controlled based on the operating regime of desired output frequency $F_{OUT}$, reference frequency $F_{REF}$ and/or division value N if appropriate. Thus the temperature monitor 202 could generate an alert if the value of control signal $S_C$ exceeds a threshold value indicating (for the relevant operating regime) an undesirably high temperature.

Whilst in some embodiments, where the output frequency $F_{OUT}$ is variable in use, the temperature monitor 202 may advantageously be provided with an indication of the output frequency $F_{OUT}$, in some embodiments the temperature monitor 202 may operate without knowledge of the actual output frequency $F_{OUT}$ yet still be operable to monitor temperature changes.

For example consider that the output frequency $F_{OUT}$ may be varied in use (e.g. via variation of reference frequency $F_{REF}$) and the value of the desired output frequency $F_{OUT}$ is not effectively available to the temperature monitor 202. In steady state, when operating at a given output frequency $F_{OUT}$, the value of the control signal may not be expected to change much in use, other than with temperature. In such a case the present value of the control signal $S_C$ may not be able to provide an estimate of the absolute temperature, since the value of $F_{OUT}$ and consequently the appropriate choice of function $T_S(S_C)$ would be unknown. However changes in the value of the control signal $S_C$ may still usefully indicate dynamic temperature changes. In particular, if the value of the control signal $S_C$ changes in a relatively continuous way in a direction that indicates an increase in temperature, then detection of such a change in the value of control signal $S_C$ may indicate a continually increasing temperature and generate an alert, especially if the rate of change increases or persists over a certain defined period of time. This could thus be used as warning of a temperature change indicating possible thermal runaway. If the reference frequency $F_{REF}$ or division ratio N were changed, this would likely lead to a more sudden change in the value of control signal $S_C$ as the loop responds to the new regime and changes output frequency. The rate of change of the control signal $S_C$ may thus jump high and then decrease. Changes in reference frequency may thus be distinguished from temperature changes in such a way. In some instance however it may be beneficial to monitor the frequency error signal ΔF for any step changes indicative of changes in reference frequency $F_{REF}$ rather than the filtered version providing the control signal $S_C$ in order to detect such regime changes.

Some embodiments thus make use of a controlled oscillator 201 which is operable with a transfer function $K_{OSC}$ that varies with temperature. The transfer function $K_{OSC}$ should advantageously vary significantly across the temperature range of interest so as to have a readily detectable impact on the value of the control signal $S_C$ required to maintain the particular output frequency $F_{OUT}$, i.e. the transfer function $K_{OSC}$ has a distinct temperature dependence. Advantageously the transfer function $K_{OSC}$ may vary such that, the value of control signal $S_C$ required to provide a given output frequency $F_{OUT}$ varies in a monotonic way across the temperature range. Thus, for a given output frequency $F_{OUT}$, each value of the control signal $S_C$ can be associated with a unique temperature (or continuous temperature range).

FIGS. 3a and 3b illustrate one example of a suitable temperature dependent transfer function. FIG. 3a illustrates how the output frequency $F_{OUT}$ of the controlled oscillator 201 may vary with temperature for a constant value of control signal $S_C$. FIG. 3a illustrates a first plot 301a of variation in output frequency $F_{OUT}$ with temperature according to a first transfer function. It can be seen that the output frequency $F_{OUT}$ varies from a first frequency $F_1$ at a temperature $T_1$ to a second frequency $F_2$ at a second temperature $T_2$. The variation in output frequency $F_{OUT}$ with temperature varies generally monotonically across the temperature range so that each different temperature would lead to a different value of output frequency. The variation in output frequency with frequency is sufficient over the temperature range of interest so that the variation in value of control signal $S_C$ required to maintain a constant output frequency would be detectable. FIG. 3b illustrates how the value of control signal $S_C$ may vary with temperature to maintain a desired constant output frequency. FIG. 3b illustrates a plot 301b of how the value of control signal may vary with temperature to compensate for the first transfer function.

FIG. 3a illustrates the output frequency $F_{OUT}$ may increase with temperature for a fixed value of control signal $S_C$, and FIG. 3b illustrates that the value of control signal $S_C$ required to maintain a desired output frequency may drop with increasing temperature. However it should be understood that these are only examples and it would be possible for example that the topology or bias of some controlled oscillator might lead its output frequency to decrease with increasing temperature or that independently the polarity of the effect of a control signal might lead the value of control signal $S_C$ required to maintain a desired output frequency to increase with increasing temperature. Likewise it should be noted that FIG. 3a illustrates a generally linear variation across the temperature range. In some instances a generally linear variation may occur in an implementation but equally, in some instances, the temperature dependence of the transfer function may vary in a significantly non-linear way over at least part of the temperature range of interest.

It will be appreciated by one skilled in art that the temperature dependence of the transfer functions illustrated by plots 301a and 301b of FIGS. 3a and 3b may not be the temperature dependence that would naturally occur in implementations of a controlled oscillator 201 of a locked-loop circuit such as an FLL. Typically the controlled oscillator 201 would exhibit a generally flatter temperature response, e.g. a transfer function that exhibits less temperature variation. FIG. 3a also illustrates an example plot 302a of how output frequency $F_{OUT}$ may vary with temperature for a second transfer function. The second transfer function may exhibit less temperature dependence than the first temperature characteristic. In this illustrative example there is some slight variation in output frequency $F_{OUT}$ with temperature but the extent of any variation is more limited that for the first transfer function, and there may be no overall trend. FIG. 3b illustrates, as plot 302b, the value of control signal $S_C$ required to maintain a constant output frequency over the temperature range for such a second transfer function. The first transfer function may, for example, exhibit a variation with temperature has a magnitude which is of the order of 15% or greater, or 20% or greater, or 25% or greater than that for the second transfer function, where the second transfer function may be the conventional expected temperature response of a locked-loop circuit which is not used for temperature sensing.

The transfer function of the controlled oscillator 201 may be controlled in various ways, but in at least some examples a bias applied to the oscillator, for instance a bias current, may be controlled so that the overall response of the oscillator has a desired temperature dependence.

FIG. 4 illustrates one example of a controlled oscillator 201. In this example the controlled oscillator 201 is controlled by a control signal $S_C$ which may be a digital control word. Thus the controlled oscillator can be seen as type of numerically controlled oscillator. The controlled oscillator 201 comprises a current controlled oscillator (ICO) 401, which may for instance be implemented by a suitable ring oscillator driven by a control current $I_C$. As will be understood by one skilled in the art the ICO 401 may comprise a ring arrangement of inverters, for example CMOS inverters. The control current $I_C$ may be applied to the supply rail of the inverters and thus controls the propagation delay of the inverters.

A programmable current source 402, such as a current-output digital-to-analogue converter (IDAC), may comprise a number of controllable current elements, with the number of elements contributing to the control current $I_C$ being selected by the value of the digital word of the control signal $S_C$. The currents deliverable by the controllable current elements may be equally or binary-weighted and be scaled with respect to a supplied bias current $I_{BIAS}$ which determines the current contribution to $I_C$ of each current element when selected. Thus the output current $I_C$ for each value of control signal $S_C$ may be proportional to the value of $I_{BIAS}$. Any variation with temperature of $I_{BIAS}$ will also lead to a proportionate variation in $I_C$.

In practice the ICO 401 will have a particular temperature dependence between the control current $I_C$ and frequency $F_{OUT}$ of the output signal $S_{OUT}$, e.g. due to the relationship between current and propagation delay of the inventors and how it varies with temperature. For conventional biasing of controlled oscillators the bias current $I_{BIAS}$ may thus be designed to have a temperature response that means that the overall temperature response of the controlled oscillator is substantially flat. A bias generation circuit 403 may thus have at least one circuit branch having a current source 404 for generating a current $I_{PTAT}$ which is proportional to absolute temperature, i.e. increases with increasing temperature, and/or at least one circuit branch having a current source 404 for generating a current $I_{CTAT}$ which is complementary to absolute temperature, i.e. which decrease with absolute temperature. The currents $I_{PTAT}$ and $I_{CTAT}$ may be generated in a ratio of α:β so as to define an overall bias current $I_{BIAS}$ which has the desired variation with temperature, which may conventionally be arranged so as to effectively provide the control current $I_C$ with a temperature variation (for a defined value of control word of the control signal $S_C$) that substantially compensates for the temperature variation of the ICO 401, e.g. to provide a temperature response as illustrated by plots 302a and 302b in FIGS. 3a and 3b.

In embodiments of the present disclosure however the bias circuit may be operable to generate a defined bias current $I_{BIAS}$ that provides an overall transfer function with a significant temperature dependence, such that over a temperature range of interest a variation in temperature would result in a measurable change in the value of the control word of the control signal $S_C$, such that the value of control signal $S_C$ required to maintain the required output frequency $F_{OUT}$ can be used as an indication of temperature. Thus the bias generation circuit 403 may be operable to generate a bias current $I_{BIAS}$ so as to provide an overall temperature response as illustrated by plots 301a and 301b in FIGS. 3a and 3b.

In some embodiments the controlled oscillator 201 may be configured so as to have a first transfer function $K_{OSC}$ that varies with temperature in a defined way, such that the value of the control signal $S_C$ can be used as an indication of temperature, and the controlled oscillator 201 may, in use, always be operated to provide the first transfer function, i.e. a temperature dependent transfer function such as illustrated by plots 301a and 301b. In use this means the relationship between the value of the control signal $S_C$ and the output frequency $F_{OUT}$ will vary with temperature. However the operation of the FLL feedback loop will maintain the output frequency $F_{OUT}$ at the desired value of $N \cdot F_{REF}$ irrespective of temperature variations. Thus it is possible to operate the locked-loop circuit 200 to provide a desired output signal and, at the same time, monitor temperature, e.g. to detect onset or likelihood of thermal runaway.

In at least some embodiments however the controlled oscillator 201 may be operable in at least first and second modes, where the temperature dependence of the controlled oscillator 201 is different in the first and second modes. In the first mode, which may be a temperature sensing mode, the controlled oscillator 201 may have a first transfer function which is temperature dependent transfer function $K_{OSC1}$ that has a desired variation with temperature such that the value of the control signal $S_C$ can be used to estimate temperature as described above. In the second mode, which may be a mode that is used when temperature sensing capability is not required, the controlled oscillator 201 may be arranged to have a second transfer function $K_{OSC2}$ that is largely temperature independent or which exhibits a lesser degree of temperature variation compared to the first operating mode. The first transfer function may, for example, exhibit a variation with temperature has a magnitude which is of the order of 15% or greater, or 20% or greater, or 25% or greater than that for the second transfer function. Thus the variation in frequency over the defined temperature range may be of the order of at least 20% greater for a controlled oscillator exhibiting the first transfer function rather than the second transfer function. For example the first transfer function $K_{OSC1}$ could provide a temperature response such as illustrated by plots 301a and 301b in FIGS. 3a and 3b, whereas the second transfer function $K_{OSC2}$ may provide a temperature response along the lines as illustrated by plots 302a and 302b.

Referring back to FIG. 2, the controlled oscillator 201 may thus be responsive to a mode control signal, MODE, to enable or disable temperature sensing and to control the mode of operation of the controlled oscillator 201 and the temperature dependence of the transfer function accordingly. The mode control signal MODE may be controlled by a signal received from some other component, such a system controller or applications processor of the like. In some instances the mode control signal MODE may also enable or disable the temperature monitor as appropriate.

The mode of operation of the controlled oscillator 201 could, in some embodiments, be implemented by selectively controlling the biasing applied. For instance as illustrated in FIG. 4 the mode control signal MODE could be used to control current sources 404 and/or 405 to vary the contribution of at least one of the $I_{PTAT}$ and $I_{CTAT}$ currents, e.g. to vary the ratio $\alpha:\beta$.

Embodiments thus enable the use of a locked-loop circuit 200, such as an FLL, to be used both to operate as locked circuit and also to provide a temperature sensing functionality. Locked-loop circuits are commonly used for clock synthesis, e.g. to generate a clock signal with a desired frequency. In order to allow for different components to the clocked at different rates in use it may be common for at least some applications to provide a plurality of locked-loop circuits on an integrated circuit. Embodiments thus may provide temperature sensing functionality using components that would in any case be present as part of the integrated circuit.

Locked-loop circuits according to embodiments can be used to provide temperature sensing in use in a number of ways. If a particular locked-loop circuit 200 is required to operate to generate a desired oscillation signal, e.g. to generate a clock signal at a particular frequency $F_{OUT}$, and it is also wished to also provide temperature monitoring, the controlled oscillator 201 of the locked-loop circuit 200 may be operated in a first mode to provide a first, temperature dependent, transfer function and the temperature monitor 202 enabled to monitor temperature. If however there are multiple locked-loop circuits and not all the locked-loop circuits are required to generate a clock signal, then one or more locked-loop circuit may be operated to generate the clock signal(s) without necessarily providing temperature sensing. In which case, in some implementations, a locked-loop circuit which is operating just to generate the respective required output frequency could be operated with the controlled oscillator operating in a second mode to provide a second transfer function that may exhibit less temperature variation than in the first mode. At least one of the locked-loop circuits which is not required for clock signal generation could be operated purely to provide temperature monitoring, in which case the relevant controlled oscillator 201 may be operated in the first mode.

A locked-loop circuit 201 which is being operated purely to provide temperature sensing may be operated as a locked-loop, i.e. with the feedback loop active so that the value of the control signal $S_C$ is controlled to maintain a desired output frequency $F_{OUT}$, in which case the temperature monitor 202 may operate as describe previously.

In some embodiments however the locked-loop circuit may also be operable in an open-loop mode, so as to generate a certain output frequency $F_{OUT}$ based on a selected fixed value of control signal $S_{CF}$ which is not controlled by the feedback loop.

Such an open loop mode may, for instance, be used on start-up so that the controlled oscillator 201 is initially controlled based on a selected fixed value of control signal $S_{CF}$, which may be an estimate of the likely required value of the control signal $S_C$ when operating in closed-loop mode. The circuit may operate in the open-loop mode for a period before switching to the closed-loop mode which may reduce the time required to lock onto the required output frequency $F_{OUT}$.

Whether or not such an open-loop mode may be used for start-up of the locked loop circuit, in some embodiments an open loop mode may be implemented to provide temperature monitoring without requiring the whole locked-loop circuit to be active. In an open-loop mode a fixed value of control signal $S_{CF}$ may be supplied to the controlled oscillator which is operated to have a first transfer function that varies with temperature as described above. In this instance the output frequency is monitored to determine an indication of the output frequency $F_{OUT}$ that is generated. In this instance the control signal value is fixed $S_{CF}$ and the output frequency is monitored, e.g. as to whether the frequency is above or below a frequency threshold that corresponds to a defined temperature threshold.

Figure 5:
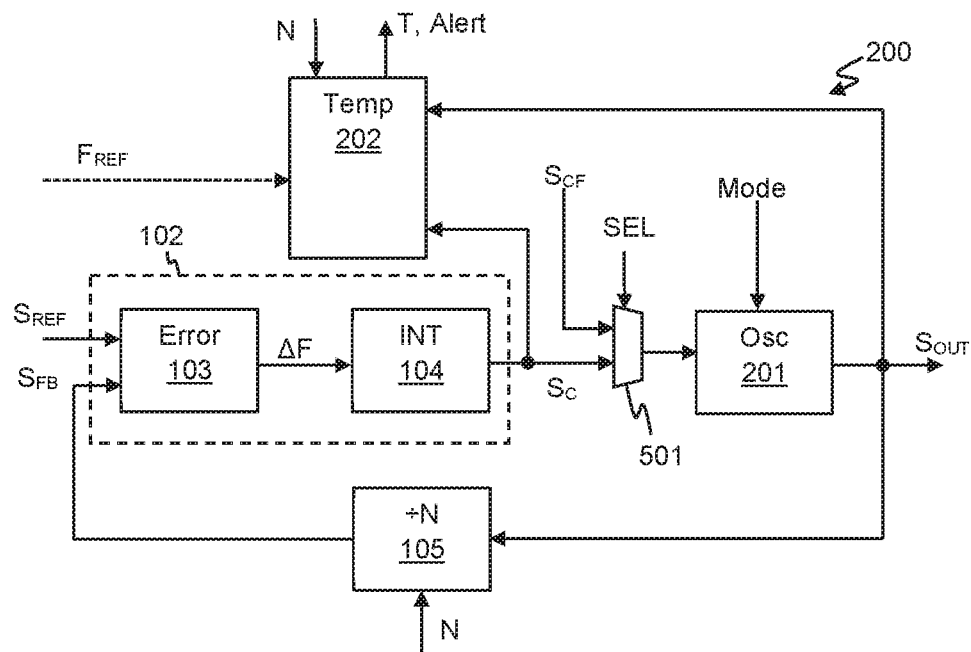
FIG. 5 illustrates another example of a locked-loop circuit operable to provide temperature monitoring.

As illustrated in FIG. 5 in some embodiments therefore there may be a switch arrangement 501 such as a multiplexor or the like that can receive a define fixed control signal value, $S_{CF}$, e.g. a defined control word and also a control signal $S_C$ from controller 102 and supply a selected one of these control signals, $S_{CF}$ or $S_C$ to the controlled oscillator based on a select signal SEL, which in some instances could the same signal as, or derived from, the mode control signal MODE. In such an embodiment the temperature monitor 202 may receive a version of the output signal $S_{OUT}$ in order to determine an indication of the output frequency $F_{OUT}$. It will be appreciated that in such an embodiment the locked-loop circuit 200 will still be operable as a locked-loop circuit, i.e. in closed loop mode, when required.

When operating in the open-loop mode, i.e. with $S_{CF}$ applied as the control signal for to the controlled oscillator, an indication of the output frequency $F_{OUT}$ may conveniently be obtained by counting the pulses of $S_{OUT}$ by a counter reset and sampled on an edge of a slower clock, for example $S_{REF}$ if available or some divided-down version thereof or some other known clock of known frequency available to the circuit. This will thus provide an indication of the ratio of the output frequency $F_{OUT}$ to the slower clock used. This value may then be used similarly to the control signal $S_C$ used in other modes: for example it may be compared to a threshold value or may be used as input to some function which will determine an estimate of temperature based on the indication of frequency. The threshold and/or the transfer function may be determined on the basis of prior simulation or measurements.

In all the embodiments above, it is assumed that a transfer function from control signal value $S_C$ to an estimate of temperature, or a control signal threshold value $S_C$ corresponding to a defined temperature (or an analogous function in terms of output frequency for an open-loop mode) is available to the circuit. Coefficients for such functions or threshold values may be determined form simulation and/or from measurement of representative samples of circuitry.

However in practice there may be substantial sample-to-sample variation in signal value $S_C$ due to manufacturing tolerances. There even be some variation, albeit generally much smaller, between circuits integrated on the same semiconductor die. In some embodiments a wide variation in say the temperature at which the occurrence of an undesirable temperature is to be flagged may be acceptable, for instance in a crude thermal runaway detector. However more accuracy may be required in some embodiments. For example a more precise measurement of temperature might be necessary to allow say a system clock frequency to be tightly managed by a control loop to be at the maximum allowable considering some temperature limit in order to maximise computing power. In such embodiments, the variation may require to be reduced.

The variations may be considered in two classes. There may be sample-to-sample variations in the current-to-frequency transfer function $K_C$ between the controlled current $I_C$ and the output frequency $F_{OUT}$ of the controlled oscillator. There may also be largely uncorrelated variations in the control current $I_C$ for a given code $S_C$ due for example to variability in the value of $I_{BIAS}$.

The variations may be reduced by measuring each manufactured sample and adjusting or trimming each sample accordingly. Trimming may involve storing some value as a digital word in some non-volatile storage where the digital word programs the value of some element such as a resistor in the circuitry. The word may be chosen, possibly in an iterative process, so as to adjust say the value of $S_C$ that will produce a given output frequency at room temperature to a desired nominal value of $S_C$.

Some embodiments may employ a relatively simple trimming procedure; some embodiments may be required to provide more accuracy and thus a more complicated trimming procedure may be necessary.

In some embodiments it may be sufficient to trim the value of $I_{BIAS}$, so that the residual variation in $S_C$ is due only to variation of the oscillator current-to-frequency transfer function K. In some embodiments, to achieve more accuracy, it may be necessary to also trim the transfer function of the oscillator, for instance by programming some secondary control voltage applied to say the back-bias voltage or gate bias voltage of some transistors in the circuit, or by programming some digitally-controllable load capacitance in one or more stages of the oscillator. In some embodiments it may be necessary to store an indication of the measured value of $S_C$ and to use this as an extra input variable to the single threshold value or to the transfer function equations used to derive temperature measure or to select the most appropriate one of a family of transfer function equations. There may still be some residual variation in the dependence of $S_C$ with temperature, but this may be only a relatively small effect.

The embodiments discussed above have been described with respect to an FLL arrangement. However temperature monitoring could be implemented in a similar way for other locked-loop circuits such as a PLL for example. A PLL would operate similarly to the FLL, but with a Phase detector or Phase-Frequency detector instead of the Frequency detector. Temperature monitoring could also be implemented using a DLL.

Figure 6:
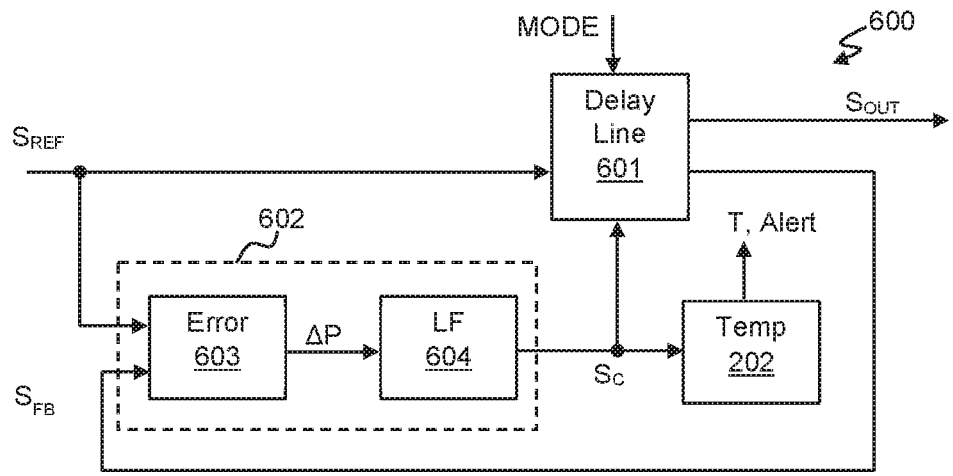
FIG. 6 illustrates a delay-locked loop circuit operable to provide temperature monitoring.

FIG. 6 illustrates an example of a DLL arrangement 600 operable as a temperature sensor. The reference signal $S_{REF}$ is input to a delay line 601.

Figure 7:
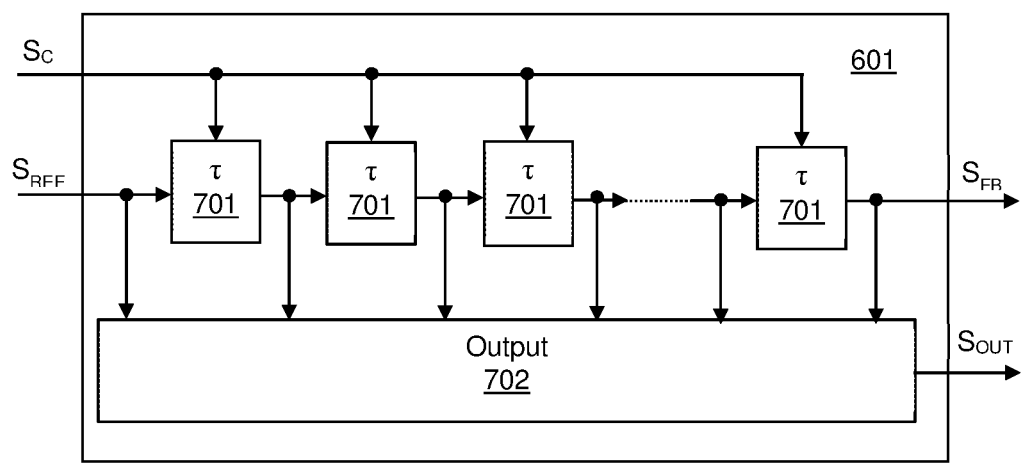
FIG. 7 illustrates one example of a delay line.

FIG. 7 illustrates an example of a suitable delay line 601 which may comprise a series connection of a plurality of delay elements 701 the delay of each of which is controlled by a control signal $S_C$ as would be understood by one skilled in the art. The output from one of the delay elements 701 may be tapped by delay line output block 702 to form an output signal $S_{OUT}$. By selecting the output of the relevant delay element 701 the output signal may have a desired delay or phase shift to the input reference signal $S_{REF}$. In some embodiments there may be more than one output signal, for instance a set of clock signals of the same frequency but different delays or phases, generated by output block 702 tapping outputs of one or more other delay elements of the delay line.

In some embodiments at least one output signal may be generated by logically combining, in output block 702, signals from outputs of chosen delay elements 701 of the delay line 601 as will be understood by those skilled in the art. This may provide an output signal at a different frequency to the reference signal $S_{REF}$, and/or allow output signals of different duty cycles. In some embodiments waveforms at outputs of chosen delay elements of the delay line may be combined in an analogue fashion to obtain outputs with intermediate values of delay, using for example known phase interpolation techniques.

A feedback signal $S_{FB}$ (possibly one of the above output signals) may also be obtained by tapping an output from one of the delay elements, possibly the final delay element as illustrated. FIG. 7 illustrated the feedback signal $S_{FB}$ derived directly from the end of the delay line but it will be understood the feedback signal could be output via output block 702. In some embodiments, a signal obtained from intermediate nodes within the delay line 601 by one or more of the techniques of the previous paragraph may be employed as the feedback signal $S_{FB}$.

Returning to FIG. 6, the feedback signal $S_{FB}$ is fed back to controller 602, which also receives the reference signal $S_{REF}$. Error block 603 determines the extent of any phase error between the feedback signal $S_{FB}$ and a desired phasing with the reference signal $S_{REF}$. The phase error $\Delta P$ may be filtered by loop filter 604 to form a control signal $S_C$ for controlling the delay line 601 by operatively controlling the delays of the delay elements 701 that make up the delay line 601. In other words, the purpose of the control signal $S_C$ is to maintain a certain timing relationship between the feedback signal and the reference signal.

The delay line 601 will have a transfer characteristic $K_{DEL}$ between the value of the control signal $S_C$ and the delay provided between the input reference signal $S_{REF}$ and the feedback signal $S_{FB}$ by the delay line 601. This delay line 601 transfer characteristic $K_{DEL}$ may inherently vary with temperature in a known way as the delay elements may have a temperature dependence as would be understood by one skilled in the art. In a similar manner as discussed above with respect to the controlled oscillator, the delay line 601 could be implemented, i.e. engineered, to have a transfer characteristic $K_{DEL}$ that has a distinct, i.e. usefully large, variation with temperature and/or the delay line 601 may be operable in different modes of operation wherein in at least one mode of operation the transfer characteristic $K_{DEL}$ has a distinct variation with temperature. At least some of the temperature variation could be derived from a bias circuit similar to that discussed above. In use, the value of the control signal $S_C$ required to maintain feedback signal $S_{FB}$ such as to have a desired phase relationship, i.e. such as to have a certain timing relationship, with the reference signal $S_{REF}$ will thus vary with temperature and consequently the value of the control signal $S_C$ may be monitored by a temperature monitor 202 in a similar way as in the embodiments discussed above.

In all the locked-loop circuits discussed, the locked-loop circuit is operable to determine a timing difference, e.g. any difference in frequency and/or phase, between a reference signal and an a feedback signal and determine a control signal for a signal timing module based on the determined difference. In other words, in all the locked-loop circuits discussed, the locked-loop circuit is operable to determine a timing relationship, e.g. a relationship in frequency and/or phase, between a reference signal and a feedback signal and determine a control signal for controlling a signal timing module based on the determined difference. The signal timing module for a PLL or FLL may be a controlled oscillator which generates an oscillation signal to be output of the PLL or FLL, whereas for a DLL the signal timing module may be a delay line that receives the reference signal and applies a controlled delay. In embodiments of the disclosure the transfer characteristic of the signal timing module varies with temperature so that the value of the control signal required to maintain the output signal to have the desired, i.e. a certain, timing relationship to the reference signal varies with temperature. The control signal can thus be monitored to provide temperature sensing.

The skilled person will thus recognise that some aspects of the above described apparatus and methods may be embodied as processor control code, for example on a non-volatile carrier medium such as a disk, CD- or DVD-ROM, programmed memory such as read only memory (Firmware), or on a data carrier such as an optical or electrical signal carrier. For many applications, embodiments of the present invention will be implemented on a DSP (Digital Signal Processor), ASIC (Application Specific Integrated Circuit) or FPGA (Field Programmable Gate Array). Thus the code may comprise conventional program code or microcode or, for example, code for setting up controlling an ASIC or FPGA. The code may also comprise code for dynamically configuring re-configurable apparatus such as re-programmable logic gate arrays. Similarly, the code may comprise code for a hardware description language such as Verilog™ or VHDL. As the skilled person will appreciate, the code may be distributed between a plurality of coupled components in communications with one another. Where appropriate, the embodiments may also be implemented using code running on a field-(re)programmable analogue array or similar device in order to configure analogue hardware.

Embodiment of the present disclosure may be implemented as an integrated circuit. Embodiments of the present disclosure may be implemented in an electronic device. The electronic device may be at least one of: a portable device; a battery powered device; a communication device; a mobile or cellular telephone or a smartphone; a computing device; a laptop, notebook or tablet computer; a gaming device; a wearable device; a voice controlled device.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in the claim, "a" or "an" does not exclude a plurality, and a single feature or other unit may fulfil the functions of several units recited in the claims. Any reference numerals or labels in the claims shall not be construed so as to limit their scope. Terms such as amplify or gain include possible applying a scaling factor or less than unity to a signal.

The invention claimed is:

1. A locked-loop circuit comprising:
    a controlled oscillator operable to generate an output signal at an output frequency based on the value of a control signal; and
    a controller operable to compare a feedback signal derived from the output signal to a reference signal received at a reference signal input to generate said control signal;
    wherein the controlled oscillator is operable in a first mode in which a value of the control signal required to maintain a certain output frequency changes with temperature; and
    the circuit comprises a temperature monitor for monitoring a temperature based on the value of the control signal;
    wherein, in the first mode the controlled oscillator has a first transfer function between the output frequency and the value of the control signal, and wherein the controlled oscillator is further operable in a second mode with a second transfer function between the output frequency and the value of the control signal that exhibits a lesser temperature dependence than the first transfer function.

2. A locked-loop circuit as claimed in claim 1, wherein the temperature monitor is configured to monitor the value of the control signal for changes that indicate a continuing increase in temperature.

3. A locked-loop circuit as claimed in claim 1, wherein the control signal comprises a digital signal having a value defined by a digital value.

4. A locked-loop circuit as claimed in claim 1, wherein the second transfer function exhibits substantially no variation with temperature over a defined temperature range.

5. A locked-loop circuit as claimed in claim 1, wherein the first transfer function exhibits a variation with temperature over a defined temperature range which has a magnitude which is 20% or greater than that for the second transfer function.

6. A locked-loop circuit as claimed in claim 1, wherein the circuit is configured to be responsive to a control signal to enable or disable temperature sensing, with the controlled oscillator operating in the first mode when temperature sensing is enabled and in the second mode when temperature sensing is not enabled.

7. A locked-loop circuit as claimed in claim 1, wherein the locked-loop circuit is a frequency-locked-loop circuit.

8. A locked-loop circuit as claimed in claim 1, wherein the locked-loop circuit is a phase-locked-loop circuit.

9. A locked-loop circuit as claimed in claim 1, implemented as an integrated circuit.

10. A locked-loop circuit as claimed in claim 1, wherein the temperature monitor is configured to monitor the value of the control signal against one or more thresholds and to generate an alert if said thresholds are crossed.

11. A locked-loop circuit as claimed in claim 10, wherein the circuit is operable such that the output frequency is variable in use and wherein said one or more thresholds are selected based on an indication of the output frequency.

12. A locked-loop circuit as claimed in claim 1, wherein the temperature monitor is configured to determine an estimate of a present temperature based on the value of the control signal.

13. A locked-loop circuit as claimed in claim 12, wherein the circuit is configured such that the output frequency is variable in use and wherein the temperature monitor is configured to determine the estimate of the present temperature based on the value of the control signal and on an indication of the output frequency.

14. A locked-loop circuit as claimed in claim 1, further comprising a switching arrangement in a signal path between the controller and the controlled oscillator, wherein the circuit is operable in a closed-loop mode in which the switching arrangement is configured to supply the control signal to the controlled oscillator from the controller and is further operable in an open-loop mode in which the switching arrangement is configured to supply a defined control value to the controlled oscillator as the control signal.

15. A locked-loop circuit as claimed in claim 14, wherein, in the open-loop mode the temperature monitor is configured to receive a version of the output signal generated in response to the defined control value and to monitor the temperature by monitoring the frequency of the output signal.

16. A locked-loop circuit as claimed in claim 1, wherein the controlled oscillator comprises a bias circuit for generating a bias for the controlled oscillator, wherein the bias circuit is configured to generate the bias having a controlled temperature dependence so as to provide a first transfer function for the controlled oscillator between the output frequency and the value of the control signal, wherein the first transfer function has a distinct temperature dependence.

17. A locked-loop circuit as claimed in claim 16, wherein the controlled oscillator comprises a current controlled oscillator and a programmable current source controlled by the control signal wherein the bias circuit supplies the bias to the programmable current source.

18. A locked-loop circuit as claimed in claim 16, wherein the bias circuit is configurable so as to provide a bias with a first temperature dependence in the first mode and a second temperature dependence in the second mode.

19. A locked-loop circuit as claimed in claim 1, wherein the circuit is operable such that the output frequency is variable in use and the temperature monitor is configured to monitor the temperature based on the value of the control signal and an indication of the output frequency.

20. A locked-loop circuit as claimed in claim 19, wherein the temperature monitor is configured to receive a version of the output signal and determine said indication of the output frequency.

21. A locked-loop circuit as claimed in claim 19, wherein the circuit comprises a frequency divider configured to apply a frequency division to a version of the output signal based on a controllably variable division value to provide said feedback signal and wherein the temperature monitor is provided with said division value as at least part of the indication of the output frequency.

22. A locked-loop circuit as claimed in claim 19, wherein the temperature monitor is configured to receive an indication of a reference frequency as at least part of said indication of the output frequency.

23. An electronic device comprising a locked-loop circuit as claimed in claim 1.

24. An electronic device as claimed in claim 23, wherein the device is at least one of: a portable device; a battery powered device; a communications device; a mobile or cellular telephone; a smartphone; a computing device; a notebook, laptop or tablet computing device; a wearable device; a smartwatch; a voice-controlled device; and a gaming device.

25. A method of temperature monitoring comprising:
operating a locked-loop circuit in a first mode or a second mode to compare a feedback signal derived from an output signal to a reference signal received at a reference signal input to generate a control signal; and
monitoring a temperature based on the value of the control signal;
wherein, in the first mode the locked-loop circuit has a first transfer function between a frequency of the output signal and the value of the control signal, and wherein in the second mode the locked-loop circuit has a second transfer function between the output of the output signal and the value of the control signal that exhibits a lesser temperature dependence than the first transfer function.

26. A locked-loop circuit comprising:
a controlled oscillator operable in a first mode with a first transfer function that varies with temperature such that a value of a control signal required to maintain a certain output frequency changes with temperature across a defined temperature range and further operable in a second mode with a second transfer function that exhibits a lesser temperature dependence than the first transfer function; and
a temperature monitor for monitoring a temperature based on the relationship between the value of the control signal and the output frequency when the controlled oscillator is operating in said first mode.

27. A locked-loop circuit comprising:
a controlled delay line operable to receive an input signal, apply a controlled delay to the input signal and output at least a first signal based on the delayed input signal wherein the controlled delay applied is based on the value of a control signal; and
a controller operable to compare a feedback signal derived from the first signal to a reference signal received at a reference signal input to generate said control signal;
wherein the controlled delay line is operable such that a value of the control signal required to maintain a certain delay changes with temperature; and
the circuit comprises a temperature monitor for monitoring a temperature based on the value of the control signal.

28. A locked-loop circuit comprising:
a reference input for receiving a reference signal;
a controlled delay line operable to apply delays to the reference signal to provide one or more delayed signals and to output a feedback signal based on one or more of the delayed signals, wherein the delays are controlled dependent on a value of a control signal, wherein the controlled delay line is operable in a mode in which the delays are also dependent on a circuit temperature; and
a controller operable to generate said control signal at a control signal value required to maintain a timing relationship between the feedback signal and the reference signal at the circuit temperature;

wherein the circuit comprises a temperature monitor for monitoring a temperature based on the value of the control signal.

\* \* \* \* \*